(12) United States Patent
Mulrooney

(10) Patent No.: US 6,279,123 B1
(45) Date of Patent: Aug. 21, 2001

(54) SYSTEM FOR VIEWING AND MONITORING EMBEDDED PROCESSOR OPERATION

(75) Inventor: Timothy J. Mulrooney, Long Valley, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/153,385

(22) Filed: Sep. 15, 1998

Related U.S. Application Data

(60) Provisional application No. 60/058,817, filed on Sep. 15, 1997.

(51) Int. Cl.[7] .................................................. G06F 11/263
(52) U.S. Cl. ................................ 714/35; 714/30; 714/34; 714/45; 714/726; 703/20; 717/4; 717/10
(58) Field of Search ................................ 714/30, 33, 34, 714/31, 35, 37, 45, 726, 727, 729, 733, 734, 742; 703/20; 716/4; 717/1, 4, 10

(56) References Cited

U.S. PATENT DOCUMENTS

| | | | |
|---|---|---|---|
| 5,321,828 | | 6/1994 | Phillips et al. ..................... 395/500 |
| 5,355,369 | * | 10/1994 | Greenbergerl et al. ............. 714/727 |
| 5,590,354 | | 12/1996 | Klapproth et al. .................. 395/800 |
| 5,598,421 | | 1/1997 | Tran et al. ......................... 371/22.3 |
| 5,600,790 | * | 2/1997 | Barnstijn et al. .................... 714/38 |
| 5,636,227 | | 6/1997 | Segars ............................... 371/22.3 |
| 5,872,909 | * | 2/1999 | Wilner et al. ........................ 714/38 |
| 5,884,023 | * | 3/1999 | Swoboda et al. ..................... 714/30 |
| 5,911,059 | * | 6/1999 | Profit, Jr. ............................ 703/23 |
| 5,933,641 | * | 8/1999 | Ma ..................................... 717/5 |
| 5,978,902 | * | 11/1999 | Mann ................................. 712/227 |

\* cited by examiner

Primary Examiner—Robert Beausoleil
Assistant Examiner—Scott Baderman
(74) Attorney, Agent, or Firm—Synnestvedt & Lechner LLP

(57) ABSTRACT

A system for viewing and monitoring the operation of an embedded processor in which a single computer program, e.g., a Microsoft C/C++3 program, is used to test the scan chain, check the link to the target device, set up the target devices on the scan chain, load the program into the device, run the program, and display the results of the program. The present invention monitors the target processor activity, such as data flow in and out of the target processor, tracking of routines running on the target processor, and the like. Instead of relying on fixed breakpoints, the present invention utilizes breakpoints embedded in the program, enabling the user to use as many breakpoints as desired and to place them and move them wherever they are needed. The breakpoints are defined and set up in the target code (e.g. a diagnostic program) and not by the host. This allows runtime flexibility because the number and location of the breakpoints can be changed easily.

10 Claims, 6 Drawing Sheets

SYSTEM FOR VIEWING AND MONITORING EMBEDDED PROCESSOR OPERATION

REFERENCE TO PROVISIONAL APPLICATION

This application is based on a Provisional Application, Ser. No. 60/058,817, filed on Sep. 15, 1997.

FIELD OF THE INVENTION

The present invention relates to a system for monitoring the operation of a target device and, more particularly, to a system for monitoring an embedded processor in real-time and without stopping the operation of the processor.

BACKGROUND OF THE INVENTION

In designing electronic circuits and equipment, for example, digital processors (DSP's), fundamental steps in the design process include the testing of the equipment (the target device), the diagnosis of problems, and the correction of the problems.

Presently, complex software tools are used to evaluate the equipment and enable corrective measures to be taken. The software tools are used with an assembler and loader. Typically, the software tools comprise hundreds of thousands of lines of code. These software tools let the user load diagnostic programs into, for example, an embedded processor such as a DSP. The loaded programs are executed, with outputs from the diagnostic program being output to the host computer at various breakpoints.

The testing and diagnosis process requires that all the software tools be in place before test programs can be written and the new hardware debugged. Delays are prevalent because conventional software tools, which are extremely complex and lengthy, may not be available when the hardware is in the early testing or prototype phase. They must be written for each new device being developed, i.e., they are project specific. The assembler and linker, however, are usually available much earlier because they are standard tools requiring little or no modification and because they are needed in several earlier modeling and simulation steps in the development of the more complex software tool sets.

In addition to the above, the use of the final software tools package requires several other steps and files to be set up in order to operate properly. Obviously there is more chance of confusion on the part of the board designers when simultaneously developing hardware and the software to test it in parallel.

Breakpoints are locations in a program that allow the host computer to interrupt the normal instruction flow to look at results of a test or tests being performed. The breakpoints typically are designed into the chip architecture and are, thus, unchangeable once the chip is constructed. In operation, the diagnostic program will run up to any breakpoint and stop the processor. Then, results obtained by the diagnostic program up to that breakpoint are transmitted back to the host computer. The software tool package will then await further input from the host computer before proceeding.

With such systems there are several problems. First, the stopping of the processor results in a significant amount of wasted time. The entire processing operation stops while the host computer evaluates the input from the embedded processor and sends an instruction back to the embedded processor or awaits human intervention in the form of input keystrokes. In addition, since the processor stops while awaiting these additional instructions, the monitoring of real-time test results is not possible.

Further, since the breakpoints are fixed by the chip architecture, they are limited in number and their locations are loaded by the host, i.e., there is limited flexibility regarding the number or locations of the breakpoints.

In view of the above constraints, it is desirable to have a process available that will allow designers to design devices using a simple procedure. It would also be desirable to utilize standard assemblers and linkers from the existing software tool sets since they are available in advance of the completion of entire software tools package. It would be further desirable to have breakpoints embedded into downloadable target software so that the breakpoints could be moved or changed at any time.

It would also be desirable to be able to download a data file, such as a debugging file or a calibration file, from the host to the target device and store the downloaded program for use during the running of the target software.

SUMMARY OF THE INVENTION

The above-identified problems with the prior art systems are corrected by the present invention in which a single computer program, e.g., a Microsoft C/C++[3] program, is used to test the scan chain, check the link to the target device, set up the target devices on the scan chain, load the program into the device, run the program, and display the results of the program. The present invention monitors the target processor activity, such as data flow in and out of the target processor, tracking of routines running on the target processor, and the like. Instead of relying on fixed breakpoints, the present invention utilizes breakpoints embedded in the program, enabling the user to use as many breakpoints as desired and to place them and move them wherever they are needed. The breakpoints are defined and set up in the target code (e.g. a diagnostic program) and not by the host. This allows runtime flexibility because the number and location of the breakpoints can be changed easily.

According to the present invention, the host computer monitors the real-time operation of a target device having a scan chain by identifying devices connected to the scan chain, downloading from the host computer to the target device, target programs associated with the identified devices; synchronously running all of the target programs; and transmitting results data, compiled as a result of running the target programs, in real-time to the host computer without interrupting the operation of the target device.

In a more preferred embodiment, breakpoints are embedded in the target program and the results data is transmitted to the host computer when the target program reaches the breakpoints.

In another embodiment, a separate data file containing, for example, calibration data or debugging data is downloaded to the target device from the host device, and the downloaded data is used by the target device when running the target program. Thus, the system of the present invention can transmit data files from the host to the target or from the target to the host in real-time without the need to stop the target program.

DETAILED DESCRIPTION OF THE PREFERRED EMBODIMENT

Figure 1:
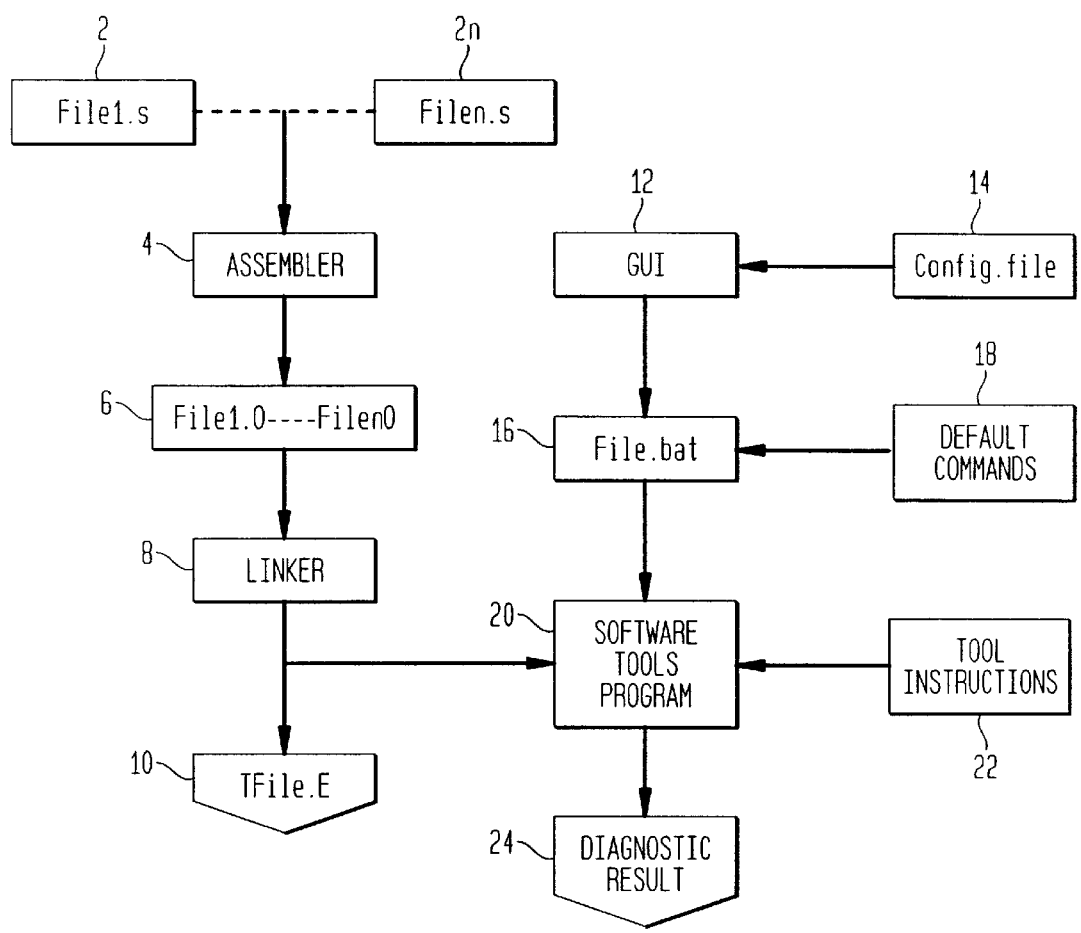
FIG. 1 is a flowchart of the prior art processes used to develop target software for a computer.

To better understand the many benefits of the present invention it is important to understand the process involved in developing software for testing target equipment. FIGS. 1 and 1 illustrate a prior art process used to develop target software for a computer. Target software is code that is assembled and linked on the host computer 50 (e.g., a personal computer) and downloaded into the target processor program memory via an ISA interface and a controller 55, using the JTAG scan chain. The controller 55 includes a Boundary Scan Master (BSM) chip to control the flow of data between the host computer 50 and the target device 60.

On execution in the target processor 60, the target software tests or operates on the target board hardware. To develop target software, a series of source codes files 2–2n are created in a conventional manner. These source code files may include, for example, diagnostic information, identification of tests to be performed, data monitoring/ logging, or applications programs to be run by the target device, and they are used to input the information needed to create the executable target file.

The target source files are input to an assembler 4 to assemble and produce corresponding object files 6. The object files 6 are fed to a linker 8 which creates the executable target program 10 (TFILE.E). The executable target file 10 is stored for use by the host computer.

A Graphic User Interface (GUI) 12 receives a configuration file 14 which configures the GUI 12 and directs it to the location of various programs used by the GUI to test and exercise the target hardware. For example, the configuration file 14 might identify which diagnostic programs will be implemented in a particular test. Based on the input from the configuration file 14, the GUI 12 selects batch files 16 needed to run the desired diagnostic program and default commands 18 initialize the selected batch files in accordance with the user requirements. Once the appropriate batch files 16 have been selected to identify the diagnostic program(s) that will be carried out, a software tools program 20 runs specific software tools designated by the configuration file 16 utilizing the target information input from the executable target program 10. The software tools program 20, configured to perform the desired test, runs the diagnostics on the target device and displays the results 24 at the host computer.

Because of the complexity of the testing performed by conventional testing programs, the batch files 16 and default commands 18 must be run and loaded properly, and the software tools program 20 must read the batch files 16 to control the test execution and result handling. This process requires the preparation of at least 4 separate files (configuration files 14, batch files 16, default commands 18, and tool instructions 22) by the user for each test in addition to the source files 2–2n needed for generating the executable target program 10.

Figure 2:
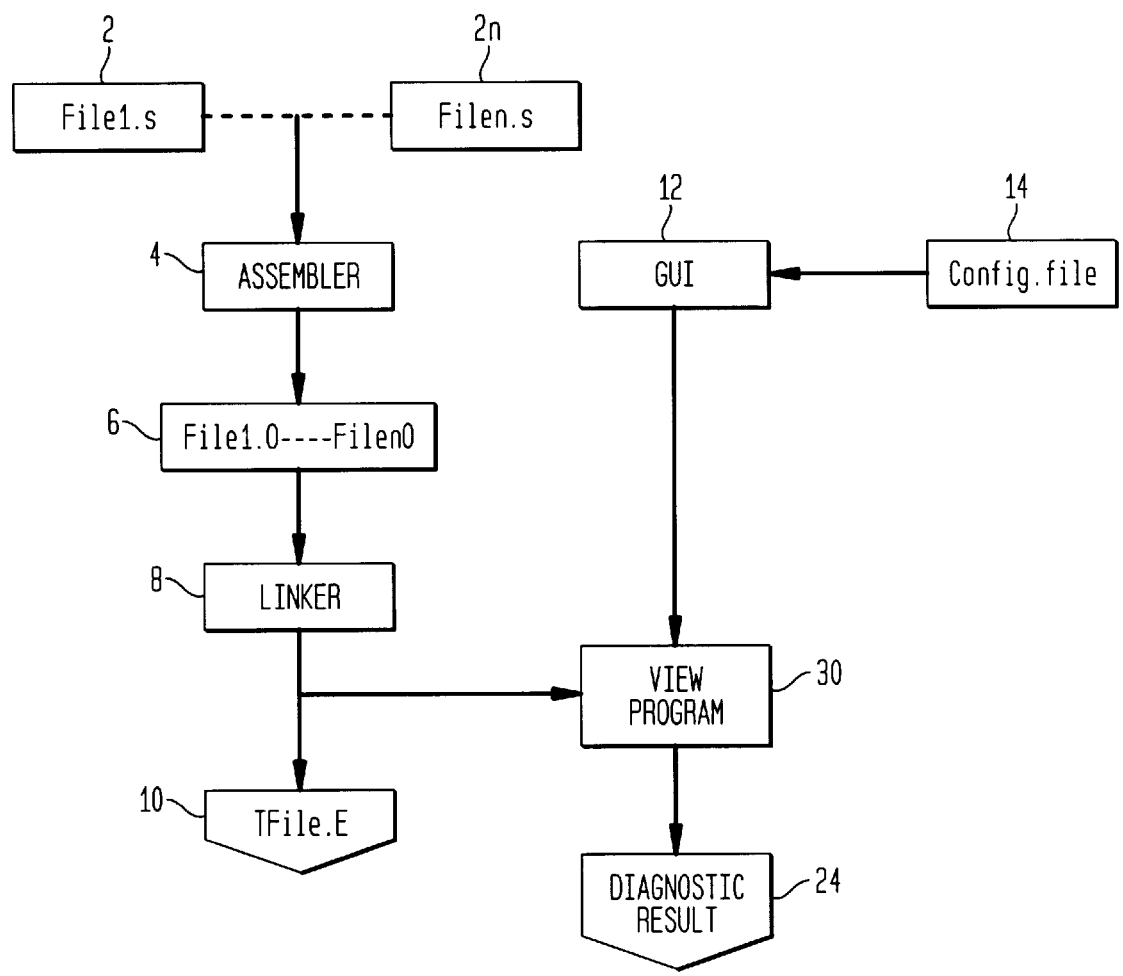
FIG. 2 is a flowchart showing the process for developing targets software of the present invention.

Referring now to FIG. 2, the process for developing the target program of the present invention is described. The target program is a set of one or more programs which are downloaded to the target device. Creation of the target source files is identical to that of the prior art. However, the execution files for the host computer are simplified and do not require the completion of a tool program or the creation of batch files and default files to control the test-execution and result-handling. Referring to FIG. 2, a DOS executable program 30, e.g., a single Microsoft C/C++[3] program (called VIEW in this example), is used to develop code to test the JTAG channel, check the link of the target device, setup the target device on the scan chain, load the program into the device, run the program, and display the results of the program. These are the only functions needed to perform the diagnostics of the present invention.

The host program 30 receives the port address, target program name, output file name, and any parameters needed by the target program from the executable target program 10. The need for a separate software tool program is not required. All that is required is a GUI and the host program 30 that runs under the GUI. The host program 30 is a "console application" and not a Windows application. This means that it will comprise a simple executable (.EXE) output.

The host side interface (where all user interaction takes place and where all results are sent) accommodates embedded breakpoints which allow the host to be told when the target has reached a certain location in the program. These embedded breakpoints can be unlimited in number. The host program 30 performs the following:

1) tests the BSM and link before each download of target code;

2) receives any data from a running target program;

3) sends any data to a running target program interactively to be loaded into registers or memory; and 4) time-stamps all test data and records all data into and out of the target.

The host program 30 is always in a monitoring mode waiting for any data from the target program. All data must be sent using the JTAG register in the host. The host user must be able to interrupt the program at any time (e.g., with a key stroke) to allow the user to terminate infinite loops running on the target device.

The present invention can be embodied in a host program 30 that operates as follows. The initialization and startup phase of host program 30 is illustrated with reference to FIG. 3. At block 100, command line parameters are decoded and verified to confirm that the nature of command line parameters are valid and that the correct number of command line parameters exists. The command line parameters may be input from the configuration file 14 shown in FIG. 2 or can be directly input from the keyboard of the host computer using the host control panel GUI, if the host user wishes to modify the diagnostics specified by the configuration file 14.

At block 110, it is determined if a hardware test has been requested. If a hardware test has been requested, a thorough hardware testing program is run to conduct the desired hardware test(s) (block 115). The details of an embodiment of one such hardware test will be described more fully below with respect to FIG. 5. If a hardware test has not been requested, the BSM is tested (block 120). If the BSM fails the test, this information is output to block 180, an error message is printed (block 190), all opened files are closed (block 200) and the program is terminated (block 210). By closing all open files at block 200, a "clean" exit of the program is ensured, because nothing is left open that might interfere with other programs. If it is determined that the BSM is functioning properly, the BSM link to the target is then tested (block 130). If the BSM link fails the test, this result is output to blocks 180–210 and the program terminates as described above.

If it is determined that the BSM link is functioning properly, the JTAG chain is tested at block 140. Next, at block 150 all DSPs are reset, all DSPs are stopped, and then the DSPs that are desired to be monitored are selected (block 160). Assuming the desired DSPs are selected, the code in the executable target files specified on the command line is loaded into the selected DSPs (block 170) and at block 220, the memory map is set so that the device will start up (when reset is released) in the correct memory configuration. Once the memory map is set, all the selected DSPs are started and the system moves to control loop 240.

Figure 4:
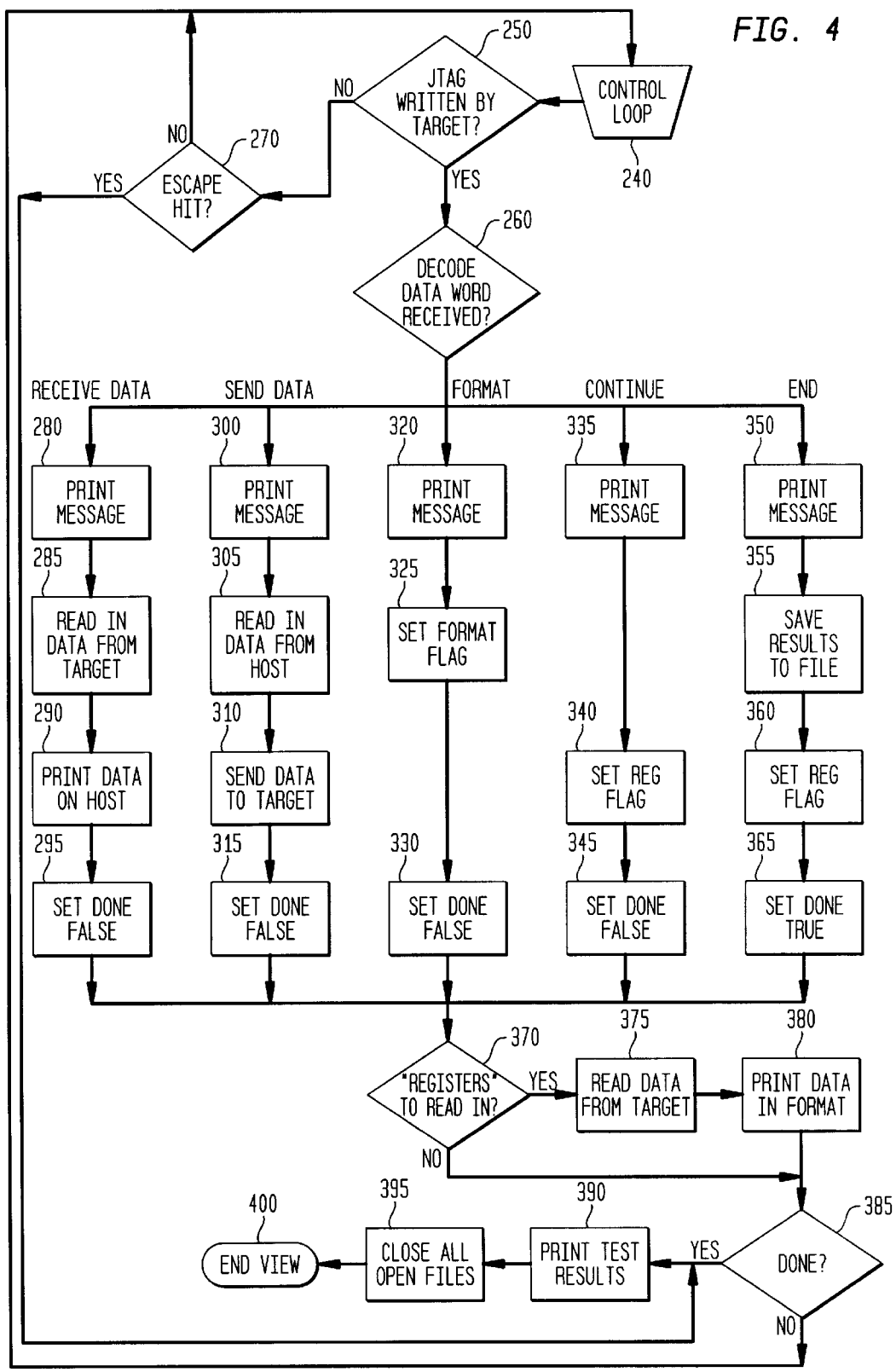
FIG. 4 is a flowchart illustrating a control loop in connection with the present invention.

Referring to FIG. 4, control loop 240 begins by determining if the JTAG register was written by the target device (block 250). The control loop continuously monitors the JTAG register for a data word (code) from the target device. Since the host program of the present invention is only a monitoring program, the target device must initiate all conversation with the host. All communications with the host are carried out via the JTAG register in the target. This is used to send and receive data to and from the host. The data words are defined and interpreted by the host program. At block 260, the data words written to the JTAG register are decoded. If the first word returning from the target is not one of the defined data words, the host program sends and/or prints an error message identifying the existence of the unknown code and the host program terminates.

In the preferred embodiment, five general categories of codes are used, as shown in FIG. 4. Obviously, fewer or more codes could be used, depending on the needs of the system. The general categories of codes shown in FIG. 4 are END codes, CONTINUE codes, FORMAT codes, SEND DATA codes and RECEIVE DATA codes. If the first word back from the target is not one of these codes, the program will print an error message identifying the unknown code, and stop.

END codes have DONE equal to "yes" or "true" and cause the corresponding message to be printed (pass, fail, complete, stopped) along with any data requested and cause the host program 30 to stop processing.

CONTINUE codes are those that have DONE equal to "no" or "false" and also send back state information (pass, fail, complete, or stopped). These are used in several cases. A typical example is a memory test where a location fails. The CONTINUE codes displays an error message along with pertinent register information, but the test is not halted. Another example is where there are several passes or individual tests involved in the target program. The CONTINUE codes cause the display of the state of each pass or test but continues with all the remaining tests. The format for the CONTINUE codes is identical to that of the END codes. The only difference is that the host program 30 does not stop. It remains in the control loop (240) monitoring the target program.

Data can be sent back any time from the target for display. The data can be sent a word or block at a time. There are two separate codes that handle these conditions. The SEND DATA code is used to indicate whether the host is to receive one word or N words and the FORMAT code determines what format to display the data (e.g., hexidecimal, decimal, etc.). The format flag is hexadecimal by default and will remain set until changed by another FORMAT code.

Examples of SEND DATA codes include the SEND_ONE_WORD code and the SEND_N_WORDS code. When the SEND_ONE_WORD code is seen, the next word loaded into the JTAG register is the data word to be sent to the host. This is displayed on the host computer with an indication which target it is from. This is useful in cases where a single word needs to be sent back during the running of the program (e.g., a loop counter at the end of each loop). The protocol for the SEND_N_WORDS code is the next word set to the JTAG register is N (word count) followed by the N words. The running program must insure that it sends N words because the host program 30 will expect to read in the number of words specified by this command. This is very useful for sending blocks of memory back to the host (e.g., a memory dump at the end of a program).

RECEIVE DATA codes allow the host program 30 to interact with (send data to) any program executing in the target. To send data to a target program, the target program must be in a wait loop for the JTAG register to be written by the host. Once written by the host and read by the target the JTAG register may be used by the target program in any way desired. The target program initiates the transfer of data from the host by sending either the code RECEIVE_ONE_WORD or RECEIVE_N_WORDS. If the latter is used the target program must also send N (word count) as in the SEND_N_WORDS example above. Once one of these codes is sent, the target program waits until the host sends the requested word or block of data. If the data word entered on the host ends in a "." the number is assumed to be in decimal format, otherwise it is assumed to be in hexadecimal. As with the SEND_N_WORDS code, the target must read N words from the host in order for the protocol to operate correctly.

An example transfer protocol is the following:

| | | |
|---|---|---|
| Dloop: | jtag = RECEIVE_ONE_WORD | /*send code to get 1 data word */ |
| d111: | if npint goto d111 | /*wait till host reads code */ |
| jintl: | if njint goto jint1 | /*DSP Waits for BSM to write to jtag*/ |
| | a0 = jtag | /*get data word from host */ |
| | . . . | /*or without labels */ |
| | . . . | |
| Dloop: | jtag = RECEIVE_ONE_WORD | /*send code to get 1 data word */ |
| | if npint goto. | /*wait till host reads code */ |
| | if njint goto. | /*DSP waits for BSM to write jtag*/ |
| | aO = jtag | /*get data word from host */ |
| | . . . | |
| | . . . | |

In the control loop of FIG. 4 if the host computer, in monitoring the JTAG register, receives a RECEIVE DATA code from the target, the fact that the code is a RECEIVE DATA code is printed (block 280), on screen and the data being received from the target is read into the host computer (block 285). The data is then displayed on the host machine (block 290) and, since an "END" code has not yet been received, an indication is output that the program is not yet completed at block 295 (e.g., SET DONE=FALSE). Next, at block 370, a determination is made if there are any registers (as specified on the command line) to read in. These registers are sent back by the target as in the case of the SEND_N_WORDS command. The difference is that the number of registers is specified on the command line, not by a special code. If there are registers to read in, the data is read from the target (block 375) and is displayed in the format as described earlier with respect to the FORMAT command (block 380). If there are not registers to read in, the system bypasses steps 375 and 380.

Next a determination is made as to whether or not the control loop has completed its monitoring task (block 385)

(DONE="True"). If it has, the test results are displayed at step 390, all open files are closed at step 395, and the program is terminated at step 400. If the monitoring program has not completed its diagnostic task, the process loops around to block 240 and checks the JTAG registers for additional information written by the target at block 250. If the word coming back from the target is a "SEND DATA" code, this message is displayed at the host (block 300), the requested data is read in from the host to the target (blocks 305 and 310) and, since an "END" code has not yet been received, the loop continues at block 315 (SET DONE= FALSE). If the code read from the JTAG register is a "FORMAT" code, this message is printed at the host (block 320), the format flag is set (block 325) to the requested type. All future data sent from the target will be displayed in the current format and the loop continues (SET DONE=FALSE, block 330). If the data word from the target indicates a "CONTINUE" code, then this message is printed at the host (block 335) and the register flag is set (block 340) to indicate any registers or values to send back from the target. This must match that specified on the command line. Once again, since an "END" message has yet to be received, the loop continues (SET DONE=FALSE, block 345).

Finally, if the data word received from the target is an "END" code, this message is displayed at the host computer (block 350). The results of the diagnostic testing are saved to the appropriate file (block 355), the register flag is set (block 360) as described earlier to match the registers specified on the command line and DONE is set to be equal to "TRUE" (block 365). At block 385, when DONE is equal to TRUE, the test results are printed (block 390), all open files are closed (block 395) and the program terminates (block 400).

Figure 3:
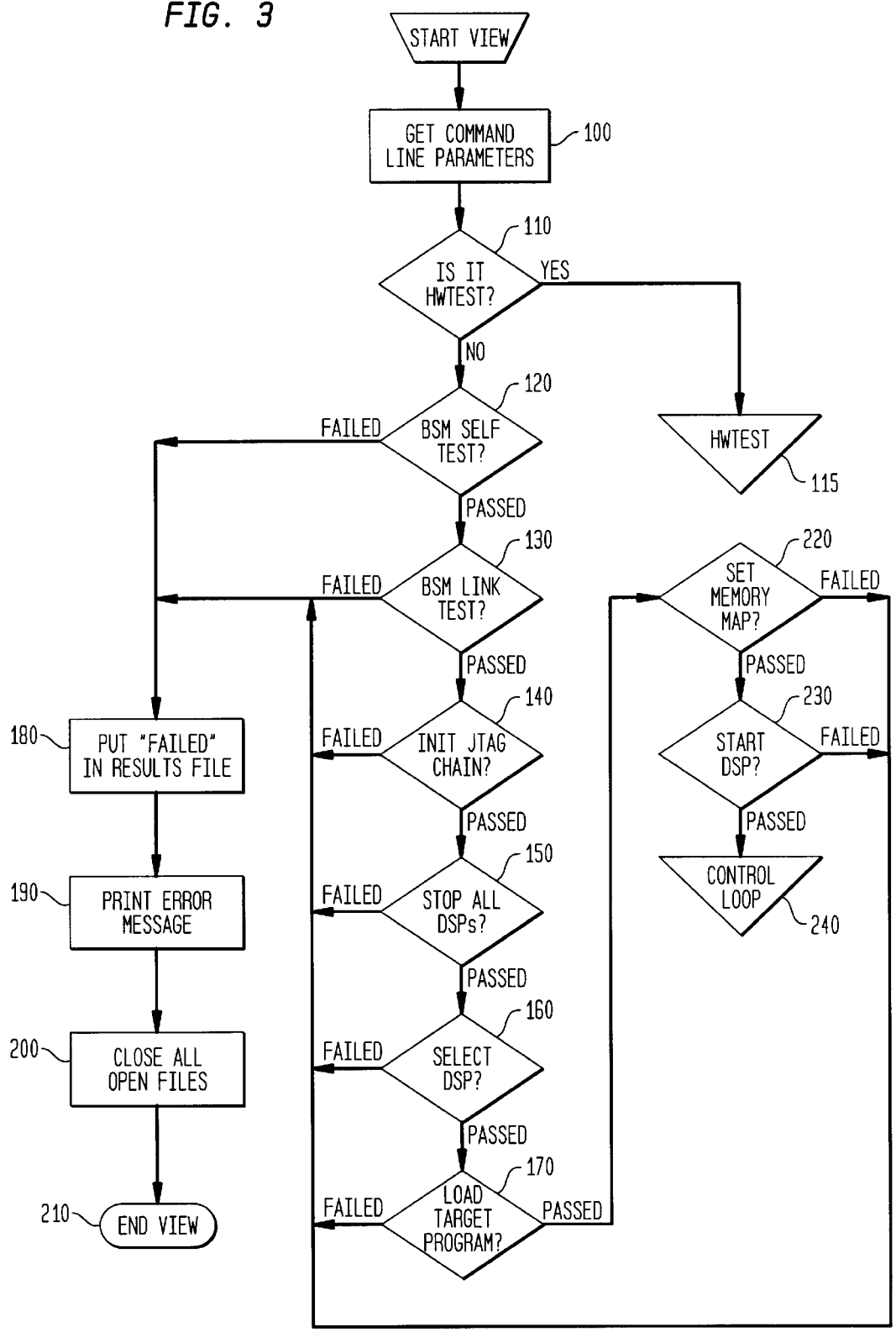
FIG. 3 is a flowchart illustrating the initialization and startup phase of a host program in accordance with FIG. 2.
Figure 5:
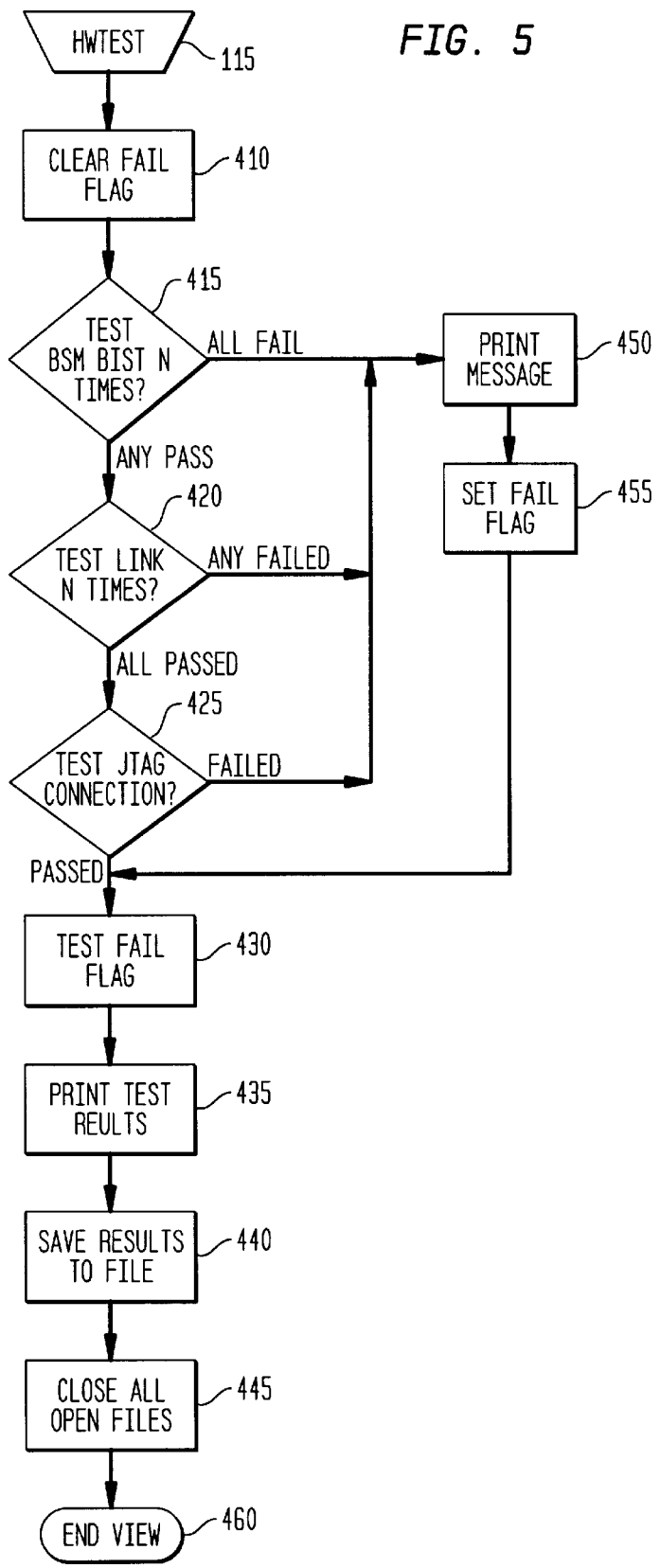
FIG. 5 is a flowchart of an embodiment of a hardware test program in accordance with present invention.

FIG. 5 illustrates an example of a hardware test (block 115 of FIG. 3). Hardware tests are standard tests to determine and assure that the hardware is functioning properly. As shown in FIG. 5, the hardware test first clears the FAIL flag (block 410) and then the BSM is tested by running its Built-In-Self-Test (BIST) a predetermined number of times (block 415). If all of the BSM tests indicate a failure, a print message is sent to the host indicating these failures (block 450), the FAIL flag is set (block 455), the FAIL flag is then tested to display the results of the tests (block 430), the test results are displayed (block 435), the results of the test are saved to the appropriate file (block 440), all open files are closed (block 445) and the program is terminated (block 460). If any of the BSM tests indicate a "pass", the link is then tested a predetermined number of times (block 420) and if any of the link tests fail, the program is directed into the "SET FAIL FLAG" loop (blocks 450 and 455 discussed previously).

If all of the link tests indicate a "pass", the JTAG connection is tested (block 425). If the JTAG connection fails, the program is directed into the "SET FAIL FLAG" loop (block 450 and 455). If the JTAG connection passes, the FAIL flag is tested at block 430, the test results are displayed at block 435, the results are saved at block 440, all opened files are closed at block 445 and the program is terminated at block 460.

Figure 1A:
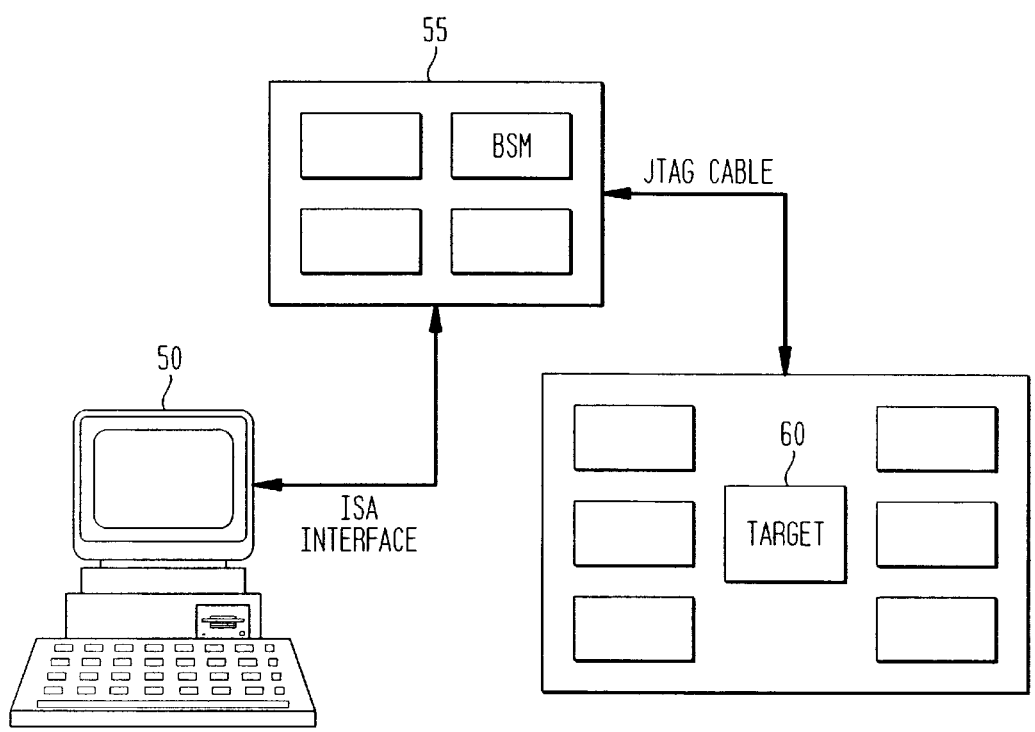
FIG. 1A is a block diagram of a typical configuration for carrying out the prior art process of FIG. 1.

The present invention requires a BSM chip in a controller 55, an ISA interface and a JTAG link to a target board 60, and a host device 50 such as a PC with an ISA interface, as shown in FIG. 1A. It should be understood that the method depicted in FIGS. 2–5 are only illustrative of the method of the present invention and that other embodiments would be apparent to someone skilled in the art of programming.

EXAMPLES

The user communicates with the monitoring program of the present invention via a command line. There are several required parameters and some optional parameters that are input on the command line. These parameters control the target executable program to be loaded and the starting memory map for the program, the number and format of "registers" or data to be displayed at certain times in the target program, the address of the BSM device, and the output file name. The command line can be incorporated into the configuration file 14, run from a Window's application control panel, or it can be typed in any DOS window for standalone operation. In a preferred embodiment, the format of the command line is as follows, assuming the name of the host program 30 is "VIEW":

VIEW [N] exfile[@map] [!device] exfile[@map][!device][strl.fmt....
strn.fmt]bsmaddress outfile <r>
    where required parameters are:

| | |
|---|---|
| exfile | Target executable file as produced from loader 8. Case insensitive. |
| bsmaddress | Address of BSM device in hexadecimal format |
| outfile | Output file to log all communication with target. "NULL" indicates no output file requested. |
| <r> | Indicates a carriage return. | and where optional files (indicated by [ ]) include

| | |
|---|---|
| N | Number of programs to load (default = 1) must be a digit 1 . . . 16. |
| map | 1, 2, 3, 4, (default = 4) startup memory map (must precede device specification if present) |
| device | 1 . . . n(default = 1) selected device on multiple device scan chains |
| strx | Any ASCII character string indicating the name of a register (data value) to be received from host |
| fmt | Format information for display of data values from target (default = hexadecimal) |

As can be seen there are a minimum of 4 arguments on the command line (counting the command VIEW itself). The optional parameters specify how many (if any) registers are to be returned and displayed by the running program and in what format and what memory map to start program execution for each program and device specified.

A special case involves a test of the BSM and the JTAG link itself without a test of the target processor. In this case the target executable file "exfile" has the name "hwtest". The target executable file "hwtest" is a built in function of the host program 30 as discussed earlier. This can be implemented with the following command line:

VIEW hwtest [loopcnt] bsmaddress outfile <r>
where:
    "loopcnt" is optional and indicates the number of passes for the link tests. The preferred default is 100.
    Additional examples of command lines include:
    VIEW led 0×310 diag.out
    This runs the target program "led" in map 4 with BSM address 0×310, and sends the results to the file "diag.out".
        VIEW fft_1t5a Frequency.d "Absolute Power.d" 0×310 diag.out This runs the target program "fft-ltSa" in map 4 with BSM address 0×310 and sends the results to the output file "diag.out". When a code is returned that indicates register values are to be displayed, two values are read in and displayed in decimal format with the titles "Frequency" and "Absolute Power" indicated.
        VIEW 2 LED1! LED2!2 0×310 DIAG.OUT
    This runs the target programs "LED1" in map 4 in device 1 and "LED2" in map 4 in device 2, with BSM address 0×310, and sends the results to the output file "diag.out".

The string (strx) argument may include spaces and multiple words if they are enclosed in quotation marks (e.g. "Absolute Power.d" above). The format codes all start with a period followed by the code. The period is required but the code can be in upper or lower case. The register strings or titles shown above end at the character before the period whenever it occurs in the line. The format information is not part of the displayed string. Obviously, there can be many variations on the command line parameters. An example of valid codes for format information are shown below:

| | |
|---|---|
| .h | Hexadecimal |
| .d | Decimal |
| .o | Octal |
| .f | Floating point Q14 |
| .f.0 | Floating point Q16 |
| .f.1 | Floating point Q15 |
| .f.2 | Floating point Q14 |
| .f.3 | Floating point Q13 |
| .f.4 | Floating point Q12 |
| .f.5 | Floating point Q11 |
| .f.6 | Floating point Q10 |
| .f.7 | Floating point Q9 |
| .f.8 | Floating point Q8 |
| .f.9 | Floating point Q7 |
| .f.10 | Floating point Q6 |
| .f.11 | Floating point Q5 |
| .f.12 | Floating point Q4 |
| .f.13 | Floating point Q3 |
| .f.14 | Floating point Q2 |
| .f.15 | Floating point Q1 |

All communication with the host is through the JTAG register in the target. This can be used to send and receive data to and from the host. The simplest way to invoke this feature is by embedding two lines of code (an embedded breakpoint) at any location when it is desired to send a code or to send data back to the host.

Following is a simple example of code which invokes the send/receive feature:

jtag=SPECIAL_CODE/*SEND CODE TO HOST*/
if npint goto/*wait unit host reveals code*/ where SPECIAL_CODE is replaced by any of the codes discussed earlier, e.g., END, CONTINUE, etc.

The first test should normally be the built-in hardware test. For the purpose of this example, the file name to run the hardware test is "hwtest.exe". By inputting "hwtest 200" to the command line, the built-in test is run with a loop count of 200. The remaining parameters of the BSM address and output file are added by the GUI, as input from the configuration file 14. Thus, this information does not have to be input on the command line when the system is running from a configuration file with GUI 12. The results of each test and detailed information about the target device appear in the results. These results are echoed on the console and written to the designated output file.

While there has been described herein the principles of the invention, it is to be understood by those skilled in the art that this description is made only by way of example and not as a limitation to the scope of the invention. Accordingly, it is intended by the appending claims, to cover all modifications of the invention which fall within the true spirit and scope of the invention.

What is claimed is:

1. A method for monitoring, from a host computer, the real-time operation of a target device having a scan chain, comprising the steps of:

identifying devices connected to said scan chain;

downloading, from said host computer to said target device, a set of target programs associated with said identified devices;

synchronously running all of said target program set;

transmitting results data, compiled as a result of running said target program set, in real-time to said host computer without interrupting the operation of said target device embedding breakpoints in said target program set;

transmitting said results data to said host computer when said target program set reaches said breakpoints;

transmitting calibration data from said host computer to said target device; and running said target device using the calibration data as input data, so that the results data can be analyzed in view of the calibration data input to the target device.

2. A method as set forth in claim 1, further comprising the step of transmitting debugging data from said host computer to said target device; and running said target device using the debugging data, so that the results data can be analyzed in view of the debugging data input to the target device.

3. A method as set forth in claim 1, wherein said results data comprises monitoring data representing real-time data regarding an operating parameter of the target device.

4. A method as set forth in claim 1, wherein said results data comprises log data representing the operation of the target device.

5. A method as set forth in claim 1, wherein said results data comprises diagnostic data representing the operational status of the hardware controlled by the target device or the target device itself.

6. An apparatus for monitoring the real-time operation of a target device from a host computer, said target device having a memory, comprising:

loading means for downloading a set of target programs from said host computer to said target device, said loading means comprising means for downloading calibration data to said target device;

processing means for synchronously running said target program set; and transmitting means for transmitting results data, compiled as a result of running said target program set, in real-time to said host computer without interrupting the operation of said target device, wherein said calibration data is stored in said memory.

7. An apparatus as set forth in claim 6, wherein said loading means further comprises means for downloading debugging data to said target device and wherein said target device includes a memory for storing said debugging data.

8. A apparatus as set forth in claim 6, wherein said loading means, processing means, and transmitting means comprise a controller which includes a boundary scan master chip.

9. An apparatus for monitoring the real-time operation of a target device from a host computer, comprising:

loading means for downloading a set of target programs from said host computer to said target device;

processing means for synchronously running said target program set; and transmitting means for transmitting results data, compiled as a result of running said target program set, in real-time to said host computer without interrupting the operation of said target device, wherein said target programs include breakpoints embedded therein, said breakpoints causing said transmitting means to transmit said results data when said breakpoints are reached during the running of said target program, the location and number of said breakpoints being adjustable by modifying said target programs.

10. An apparatus for monitoring, from a host computer, the real-time operation of a target device having a scan chain and a memory, comprising:

identifying means for identifying devices connected to said scan chain;

loading means for downloading a target program set from said host computer to said target device, said loading means comprising means for downloading calibration data to said target device and storing said calibration data in said memory;

processing means for synchronously running said target program set; and transmitting means for transmitting results data, compiled as a result of running said target program set, in real-time to said host computer without interrupting the operation of said target device.

\* \* \* \* \*